United States Patent [19]

Birk et al.

[11] Patent Number: 4,703,440

[45] Date of Patent: Oct. 27, 1987

[54] METHOD AND APPARATUS FOR PROCESSING ULTRASONIC ECHO SIGNALS

[75] Inventors: Adalbert Birk; Ulrich Saugeon, both of Erlangen, Fed. Rep. of Germany

[73] Assignee: Siemens Aktiengesellschaft, Berlin and Munich, Fed. Rep. of Germany

[21] Appl. No.: 14,211

[22] Filed: Feb. 5, 1987

Related U.S. Application Data

[63] Continuation of Ser. No. 589,655, Mar. 14, 1984, abandoned.

[30] Foreign Application Priority Data

Mar. 14, 1983 [DE] Fed. Rep. of Germany ....... 3308994

[51] Int. Cl.$^4$ .......................... G06F 15/72; H04N 7/01
[52] U.S. Cl. .................................... 364/521; 358/112; 358/140; 364/518; 367/7; 367/11; 342/185; 342/195
[58] Field of Search ................. 358/112, 140; 342/185, 342/195; 367/7, 9, 11; 364/518, 521; 340/798, 799

[56] References Cited

U.S. PATENT DOCUMENTS

| | | | |
|---|---|---|---|
| 3,827,027 | 7/1974 | Towson et al. | 343/5 DP |
| 4,173,007 | 10/1979 | McKeighen et al. | 367/111 |
| 4,245,250 | 1/1981 | Tiemann | 358/140 |
| 4,310,907 | 1/1982 | Tachita et al. | 358/112 X |
| 4,387,365 | 6/1983 | Berry et al. | 343/5 SC |
| 4,393,444 | 7/1983 | Weinberg | 343/5 DP |
| 4,468,747 | 8/1984 | Leavitt et al. | 358/112 X |

Primary Examiner—Errol A. Krass
Assistant Examiner—Kevin J. Teska
Attorney, Agent, or Firm—Hill, Van Santen, Steadman & Simpson

[57] ABSTRACT

A method and apparatus for processing ultrasonic echo signals employ intermediate storage and representation of the echo signals in the form of image vectors, such storage and representation proceeding independently of the scanning technique utilized to generate the image vectors, such that switching among various scanning techniques is permitted. The full length of each image vector is written into an image memory in column fashion, the stored vectors being read out as image signals in a format suitable for specific types of representation, such as on a television monitor, the format instructions being contained in a memory or generated by an arithmetic unit. Upon read out from the image memory, the geometric form of the ultrasonic scan is reconstructed in a position and form corresponding to the actual scan, and the ultrasonic echo signals are similarly represented at their true positions.

16 Claims, 6 Drawing Figures

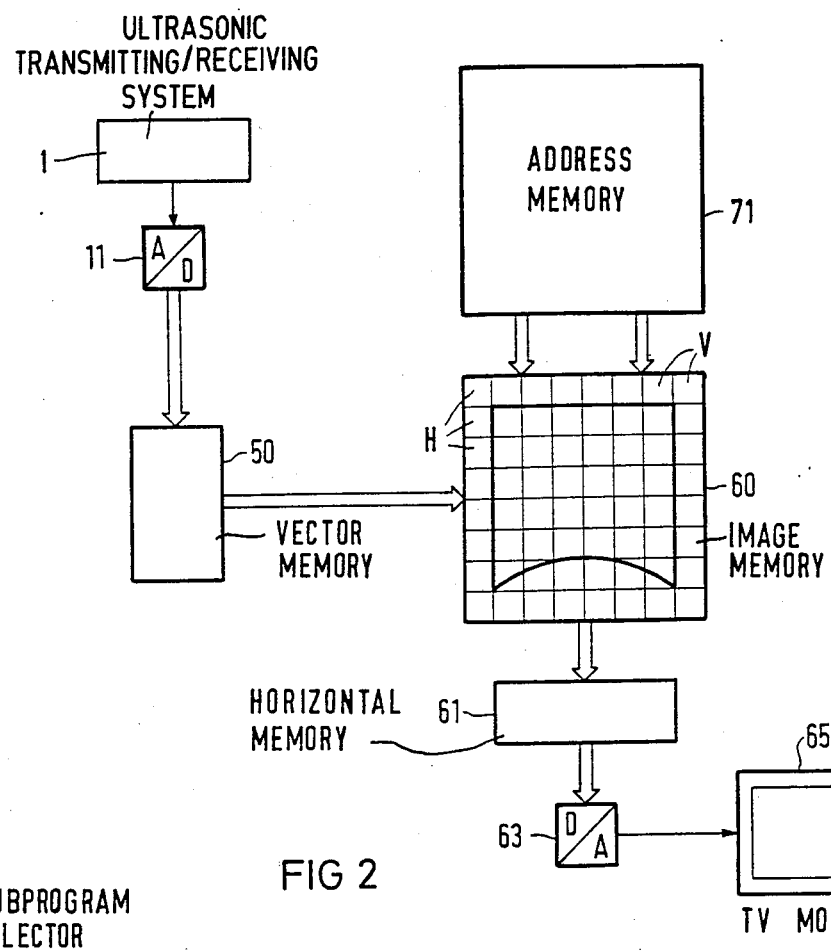

METHOD AND APPARATUS FOR PROCESSING ULTRASONIC ECHO SIGNALS

This is a continuation of application Ser. No. 589,655, filed Mar. 14, 1984 now abandoned.

BACKGROUND OF THE INVENTION

1. Field of the Invention

The present invention relates to a method and apparatus for converting ultrasonic echo signals, occurring in succession in the form of image vectors, into image signals which are utilized for representing the scanned subject on a monitor in a format which is geometrically correct and which conforms to standards necessary for television representation, the image vectors being obtained in ultrasonic scans, and the ultrasonic scans respectively exhibiting a defined geometric form with the image vectors being intermediately stored in an image memory.

2. Description of the Prior Art

Echo signals obtained by ultrasonic scanning techniques may be in the form of parallel or non-parallel image vectors such as, for example, in sector format. Such signals are obtained by means of an ultrasonic head which may operate according to the parallel scan method (electronic or mechanical sector scan) or according to the trapezoidal scan method.

If the ultrasonic sector scan method is utilized, it is preferable to reproduce the image information generated thereby in a geometrically correct fashion in the form of image vectors displayed in a fan-shaped pattern, that is, a non-parallel pattern, in a homogenous image on the viewing screen of a television monitor. As used herein the term "image vector" is the echo information received along an ultrasonic line after emission of an ultrasonic pulse. After corresponding processing, the information is in digital form as a "one-dimensional vector." In the sector scan method, various angular directions proceeding from a common point for each of the vectors exist for various scanning times. For a so-called "real time" display conforming to television standards, it is thus necessary to employ a scan converter with an intermediate memory. The intermediate memory generally consists of a two-dimensional image memory as well as a one-dimensional "vector memory" for the purpose of writing-in or inscription, and a one-dimensional "horizontal memory" for the purpose of reading out, both of which are normally operated according to the alternating buffer principle.

In conventional methods and devices, such storage is generally undertaken with digital semiconductor memories. A scan converter is disclosed in U.S. Pat. No. 4,245,250 for an ultrasonic sector scanner which has the objective of attaining a frame repetition rate which is as high as possible. The scan lines generated by the sector scanner ("phase array") are therein scanned with varying frequency. The ultrasonic echo signals or scanning data thus acquired along a scan line are written into one of four main memories. Pre-connected time delay devices serve as intermediate memories. Each of the main memories, realized in two-dimensional form, is equipped for accepting one-forth of the complete ultrasonic echo image. Through application of the variable frequency during scanning, a "data reduction" is effected during inscription into the main memories.

SUMMARY OF THE INVENTION

It is an object of the present invention to provide a method and apparatus for converting ultrasonic signals into image signals which permits intermediate storage and representation of image vectors corresponding to the echo signals independently of the type of scanning technique which is utilized for generating the image vectors.

It is another object of the present invention to provide such a method and apparatus which permits switching among various scanning techniques.

The above objects are inventively achieved in a method and apparatus wherein the individual image vectors are written full length into an image memory in column fashion, the stored image vectors then being read out for display on a television monitor with the use of information specifically tailored for a particular type of representation, this representation information being contained in a memory or being generated by an arithmetic unit. Upon read out from the image memory, the geometric form of the ultrasonic scan is reconstructed in the same shape and position as the original scan, and the ultrasonic echo signals are similarly represented at their true positions.

The apparatus for practicing the method disclosed and claimed herein has an orthogonal matrix memory as part of the image memory, and an address memory having the same matrix memory as the image memory, which contains the representation information.

In contrast to conventional methods and apparatus for ultrasonic echo signal representation, the method and apparatus disclosed and claimed herein permits relatively simple inscription of the image information into the matrix memory, and the writing-in or inscription is entirely independent of the specific geometric image format, that is, independent of the scan technique utilized to generate the echo signals.

In addition to the conventional sector image format, for example, complete circle sectors, rectangular formats, or trapezoidal formats may be processed utilizing the method and apparatus disclosed and claimed herein.

The address memory utilized in the method and apparatus disclosed and claimed herein may be a bank of PROMs, ROMs or RAMs. The use of RAMs has the advantage that, by means of an arithmetic unit such as a computer or processor, an additional address calculation can be carried out during the image observation. This permits the option of altering the image format and displaying an image section which is not readily possible in conventional sector scanners. Moreover, with small additional outlay, the method and apparatus may be adapted to carry out a zoom operation, that is, reduction and enlargement of the illustrated image section.

Because no vector interpolation is necessary for the image vectors processed according to the method and apparatus disclosed and claimed herein, writing in of the image information can also proceed directly, that is, without a vector memory. An address arithmetic unit, or address bank, is necessary only for the read out. Parallel inscription of the image information into the main memory without costly address computation may be employed for the purpose of increasing the inscription frequency of the memory by means of recording parallel blocks. The write-in and read out frequency, related to an ultrasonic vector, of the entire image memory may thereby be controlled by the frequency of an individual block. This makes possible the processing of parallel blocks such that the write/read frequency of the image memory becomes independent of its matrix size.

DESCRIPTION OF THE DRAWINGS

FIG. 2 is a block circuit diagram of the method and apparatus disclosed and claimed herein.

FIG. 3 is a detailed circuit block diagram for use with the circuit shown in FIG. 2 for generating information for the address memory.

FIG. 4 is a detailed circuit block diagram for use with the circuit shown in FIG. 2 for controlled read out of the information from the image memory.

DESCRIPTION OF THE PREFERRED EMBODIMENTS

Figure 1:
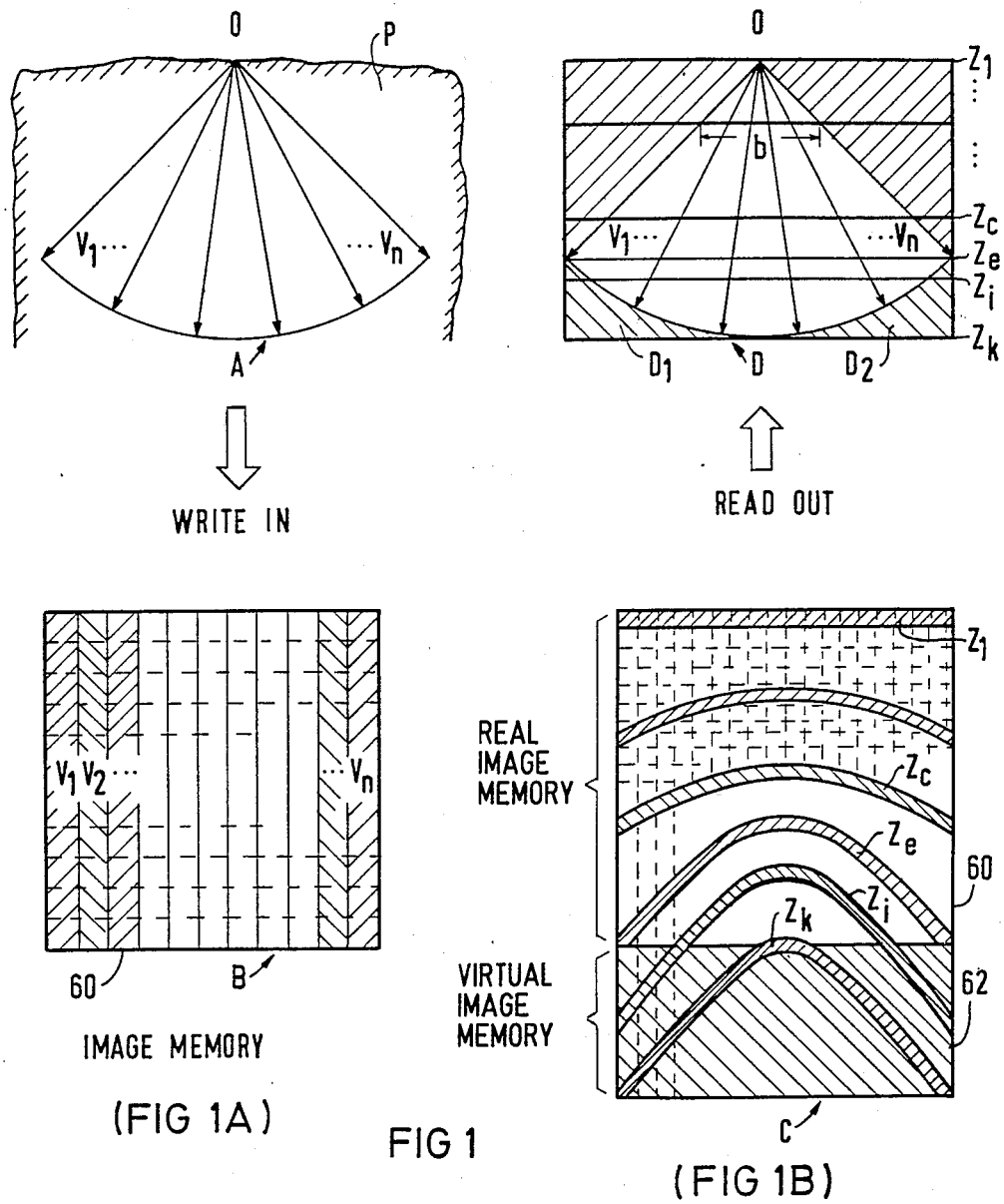
FIG. 1A is a schematic representation showing inscription of image vectors obtained during a scan into an image memory.
FIG. 1B is a schematic representation of the read out of image signals from the image memory for display thereof.

The inscription of image vectors corresponding to ultrasonic echo signals obtained during an ultrasonic sector scan of a subject P in accordance with the principles of the present invention is shown in FIG. 1A. The sector scan, consisting of a plurality of ultrasonic image vectors $V_1, V_2 \ldots V_n$ having a common origin O is shown in the upper portion A of FIG. 1A, and the image memory 60 into which those vectors are inscribed is shown in the lower portion B.

The matrix memory of the image memory 60 upon read out of individual video lines $Z_1 \ldots Z_j \ldots Z_k$, as well as an imaginary virtual memory 62, desribed in greater detail below, are shown in the lower portion of C of FIG. 1B, and the representation of the read out lines $Z_1$ throu $Z_k$ on a television monitor is shown in the upper portion D of FIG. 1B. The ultrasonic image vectors $V_1$ through $V_n$ obtained by sector scanning may be generated by a mechanical or electronic vector scanner. As stated above, the term "image vector" as used herein is the echo information received along a scan line after emission of an ultrasonic transmit pulse. Such image vectors are received in the form of a one-dimensional data chain. For various scan times, in the case of the sector scan method, various angular directions proceeding from a common point of origin O result for the individual vectors. In the upper portion A of FIG. 1A, the latter are represented in the form of a ray-shaped fan. The individual vectors $V_1 \ldots V_n$ respectively carry the echo intensity modulation in the form of image information. As described in greater detail below, the fan shown in the upper portion D of FIG. 1B is geometrically correctly represented on the monitor. In the rectangular field of the viewing screen, the area not swept by the ultrasonic image vectors are blanked. Such as the areas to the left and right of the fan in upper portion D.

The memory method disclosed and claimed herein is applicable to the medical field, wherein it may be employed in conjunction with ultrasonic echo devices with which different scanning methods may be undertaken such as, for example, linear arrays, curved arrays, or trapezoidal arrays. It is possible to switch among the different scanning methods or scanning types of the particular echo apparatus utilized. The processing method and apparatus disclosed herein is thus in principle independent of the scanning type.

In accordance with the principles of the present invention, all image information obtained during the course of an ultrasonic examination of a subject is stored in the form of parallel, equal length image vectors $V_1 \ldots V_n$ in the matrix of the image memory 60. This has the advantage that all data acquired from the information can be stored without data reduction and the data is subsequently available for such data reduction as may be possibly necessary and/or for possibly desired image processing.

In order to reconstruct the sector format upon read out of the data for video representation, the read out must proceed corresponding to a specific rule. Conventional read out, in contrast to the method disclosed herein, proceeds horizontally. In the present method, however, the read out lines $Z_1$ through $Z_k$ (as shown in the lower portion C of FIG. 1B) are entered in a "hatched" fashion. For example, the sector tip or origin O is to be displayed with the read out line $Z_1$. It is apparent that precisely within the sector tip, the image information of all image vectors would theoretically have to be represented at the same position or point, however, this is not possible. For an actual read out this means that a data reduction must be undertaken in the case of the sector scan method (in the case of a linear array such reduction is not necessary). For this purpose, the contents of only a specific, previously selected memory cell of the read out line Z1 of the image memory 60 is read out and is represented in the center of the horizontal video line $Z_1$ in the upper portion D of FIG. 1B. By contrast, the mean value of all memory cells of the read out line Z1 may also be formed and represented.

The additonal read out lines $Z_2 \ldots Z_k$ are read out in such fashion that distortion of the sector field which has taken place due to the parallel storage of the vectors $V_1$ through $V_n$ is again cancelled. Accordingly the read out of the lines $Z_2 \ldots Z_k$ is conducted along curved lines, for which purpose a corresponding rule, table, allocation or the like, is stored in a respective address memory. An example of such a read out of the image vectors $V_1 \ldots V_n$, intermediately stored in the image memory 60, by an address control is described in detail below on the basis of FIG. 5 for the sector format.

Additionally, for read out of the read out lines $Z_2$ through $Z_c$, a data reduction, according to conventional methods, is conducted. This data reduction is undertaken because the viewing screen lines Z2 through $Z_c$ in the representation range b of the sector does not provide sufficient room in order to represent all information which is present.

From the lower portion C of FIG. 1B, it is apparent that the read out lines Z are increasingly curved with an increasing index running from 1 through k. The read out curve for the "corner line" is referenced at $Z_e$. This line runs through the corner points of the scan sector which are at the farthest extremes. From the upper portion D of FIG. 1B, it is apparent that the corner line also runs through the corresponding corner points. All following read out lines comprise subject regions not detected during the course of the ultrasonic scan which are further remote from the point of origin O than the length (equal penetration depth) of the ultrasonic image vectors $V_1$ through $V_n$. The read out curve $Z_i$ comprises, for example, image information only at its center region, and the read out curve $Z_K$ has virtually only a single information value at the center thereof.

It must be remembered, therefore, that the data of the ultrasonic image vectors $V_1$ through $V_n$ stored in the image memory 60 is not read out horizontally, but according to increasingly curved read out lines $Z_1$ through $Z_k$, as a consequence of which a distortion-free image reconstruction of the scanned subject is possible.

In the lower portion C of FIG. 1B, beneath the "real" image memory 60, a "virtual" image memory 62 is represented. This virtual image memory 62 is in reality not present in the form of hardware, however, the method described herein operates as if the virtual image memory 62 were actually existent. The virtual image memory 62 is indeed addressable, and delivers the "black" information for the monitor, which information is contained in the image regions $D_1$ and $D_2$ shown in the upper portion D of FIG. 1B. The use of the virtual image memory 62 serves to simplify the method, making it possible to apply the same read out method over the entire image. The function of the virtual image memory 62 will be explained in greater detail in connection with FIG. 5.

A schematic circuit diagram for an apparatus for practicing the method disclosed and claimed herein is shown in FIG. 2. An ultrasonic transmitting/receiving system 1 generates the necessary ultrasonic image information. The system 1 may, for example, be in the form of a mechanical sector scanner, a compound scanner, or a number of adjacently disposed transducer elements in the form of a linear array or in the form of a so-called "phased array." Further details for signal and process control within the system 1 are not shown for purpose of simplicity, however, the construction of such a system will be well known to those skilled in the art.

The received echo signals from the ultrasonic system 1 are supplied to an analog-to-digital converter 11 in the form of respective ultrasonic image vectors according to the definition provided earlier. The digitized image vectors are stored in a one-dimensional vector memory 50. Two vectors may simultaneously be inscribed or read out from the memory 50 according to the alternating buffer principle.

The data for each image vector are respectively transmitted in succession from the vector memory 50 to the image memory 60. The individual vectors are stored therein in parallel columns of the matrix memory. To this end, the image memory 60 consists of a cartesian matrix memory with m rows H and n columns V. The number n may be the number of vectors per image, however, n may also be greater than this number.

A two-dimensional address memory 70 is associated with the image memory 60, which exhibits the same matrix structure as the image memory 60 and which contains the information for specific representation of the data, such as by table, computation rule, allocation or the like. The sub-units for attaining the address data pertaining to the address memory 70 such as, for example, a programmable computer and process control units for read out of the data from the image memory 60, are not shown in FIG. 2 for purpose of clarity, however the function of those units insofar as it relates to the subject matter of the method and apparatus disclosed and claimed herein shall be explained in greater detail in connection with following figures. The process control in conjunction with the address memory 70, among other things, insures read out of the data stored in the image memory 60 along the curved read out lines $Z_1$ through $Z_k$.

A one-dimensional horizontal memory 61 is connected after the image memory 60 in the direction of data transmission. The horizontal memory 61 serves the function of a video line memory. Control units for the horizontal memory 61 are not shown in FIG. 2. From the horizontal memory 61 the data is supplied to a digital-to-analog converter 63, and from there is supplied to a television monitor 65 as a brightness control signal or image information. The horizontal memory 61 preferably also operates according to the alternating buffer principle.

The address memory 70 with its address control unit, and possibly with an associated arithmetic unit, is utilized for the purpose of specifying the table, rule or allocation by which the data is to be represented. The use of an arithmetic unit in conjunction with the memory 70 insures that the address information for the true-to-format read out of the parallel-stored image vectors $V_1$ through $V_k$ is generated and written into the address memory 70. This arithmetic unit may be eliminated if the address memory 70 is in the form of a PROM or a ROM, those types of memories already containing the desired address information.

An address memory 71 having an associated unit 72 for addressing the column addresses and an associated unit 73 for addressing the line addresses is shown in FIG. 3. The units 72 and 73 may, for example, be counters. A process control unit 75 controlling the address units 72 and 73 is also provided, as is an arithmetic unit 102 for the address memory 71, also controlled by the process control unit 75. A computing rule selector unit 101 selects the computing rule for generating the allocation, table or the like which is to be stored in the address memory 71. The computing rule selector unit 101 may contain a subprogram for the arithmetic unit 102. A subprogram selector 100 permits selection of the subprogram, and hence selection of the type of scanning operation, such as sector scan, parallel scan, trapezoidal scan, etc. It is possible to switch among the various types of scanning operations by means of the subprogram selector 100, for which purpose a corresponding ultrasonic head is available (not shown in FIG. 3).

The arrangement shown in FIG. 3 generates the information for the address memory 71. Such information generation may alternatively proceed, as mentioned above, by means of a special address arithmetic unit or by means of processing a specified algorithm. As a result, the address memory 71 contains information which guarantees a true-to-format read out of the image memory 60. The address memory 71 may be designed in the same matrix format as the image memory 60, and may be in the form of a bank of PROMs, ROMs or RAMs.

Information flow from the address memory 71 to the image memory 60 during a read out is illustrated in FIG. 4. The address memory 71 is controlled (or activated) by a line address control unit 77. The contents of the address memory 71 here comprise only the line addresses for the image memory 60, that is, the addresses within a column of the image memory 60. This line address information is supplied to the image memory 60. Both the address memory 71 and the image memory 60 are controlled by a column address control unit which identifies the address of the column to be read out. The method illustrated in FIG. 4 effects a re-coding of the television lines to be represented into the curved read out lines of the image memory 60. The line address, released by the control units 76 and 77 to the address memory 71, is thus recoded in such a fashion that the information located at the specific line address and column address in the address memory 71 is employed as the line address for the image memory 60. Because the column addresses for the address memory 71 and the image memory 60 are identical and are simultaneously supplied to both of those memories, not only the column address, but also the sought-for line address for the image memory 60 is determined. From the memory location specified thereby, the stored information can be read out and supplied for display.

By such address calculation, a randomly specified image format (parallel scan, sector scan, etc.) can be generated. In addition to display of the normally scanned sector fields, during the image observation, the illustrated image may be modified in its dimensions, particularly in the case of a sector scan, by means of an additional address calculation. Thus, randomly selectable image sections can be represented, for example, a section at a random location in a corresponding enlargement. In this manner zooming of the image is also possible.

As explained above, the storage and read out method illustrated in FIGS. 1 through 4 is applicable to various types of scan. The transition from one type of scan to another simply requires a software changeover, which can be done on the same apparatus, for example, calling another subprogram in the selection unit 101 which causes the arithmetic unit 102 to enter a new allocation, table, or the like in the address memory 71. If a new allocation is entered in the address memory 71, nothing is changed in the read out method from this address memory 71. By means of the new allocation, table or the like, the image memory 60 is simply read out in another fashion, such as, for example, in the case of a sector scan, according to the curved read out lines $V_1$ through $V_k$ (lower portion C of FIG. 1B) and, for example, in the case of linear scan, the read out proceeds by means of horizontal read out lines (not illustrated). Thus for all possible types of scanning, the same processing hardware is employed.

In a further embodiment of the invention (not illustrated) the image memory 60 may operate as an alternating buffer memory, in which case the vector memory 50 and the horizontal memory 61 are not required. In this modification, the virtual memory 62 can also be eliminated.

An exemplary read out of information from the image memory 50 will be explained utilizing the schematic representation of such a read out illustrated in FIG. 5.

Figure 5:
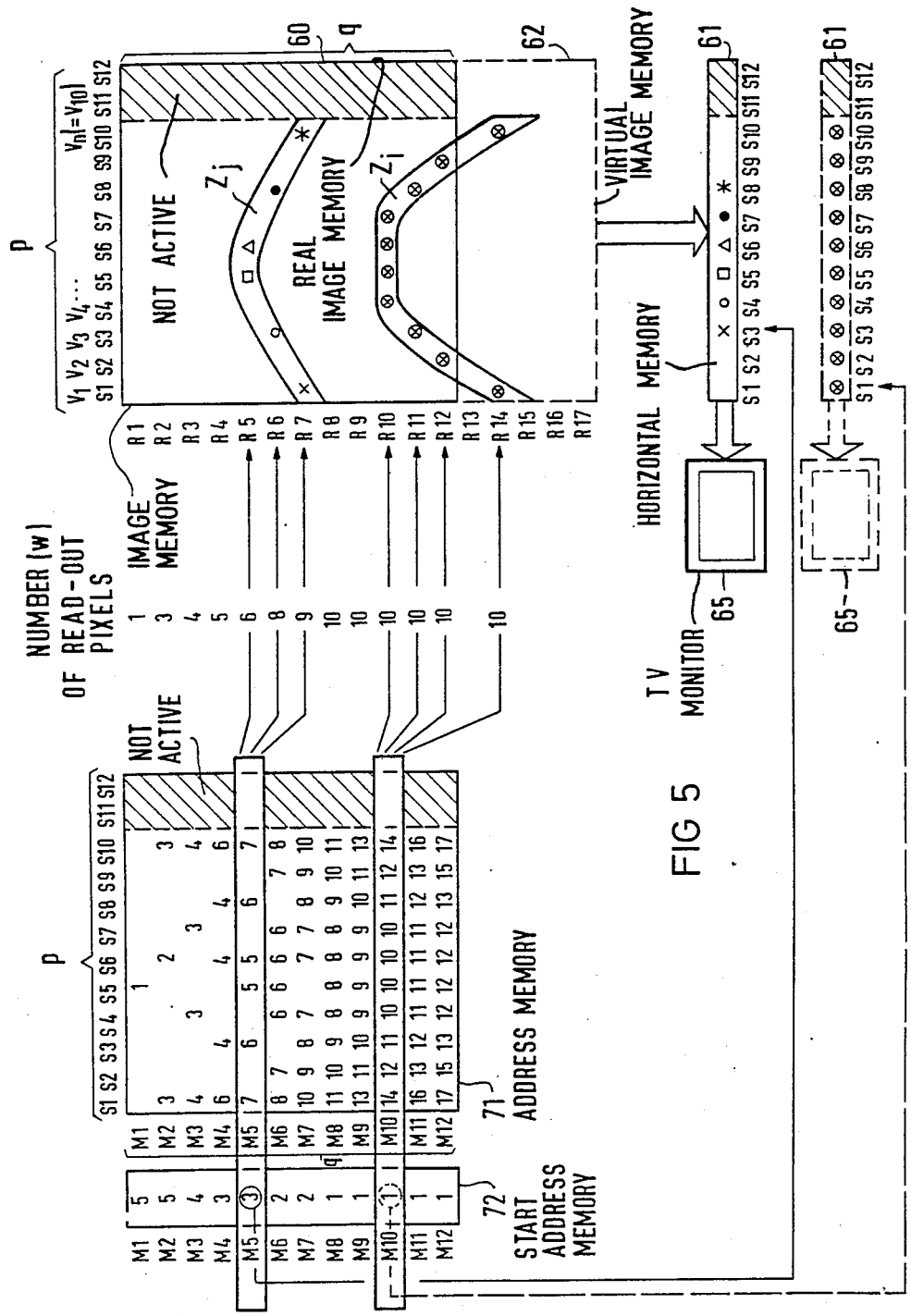
FIG. 5 is a schematic representation of an example of a read out of a video line from the image memory in accordance with the principles of the present invention.

As shown in FIG. 5, the image memory 60 and the address memory 71 are in the form of matrices with p×q memory positions. In order to explain the read out method, a simplified example is selected: a sector is assumed consisting of a first half-sector with five vectors $V_1$, $V_2$, $V_3$, $V_4$ and $V_5$ and a second half-sector also having five vectors $V_6$, $V_7$, ... $V_n = V_{10}$, and a half-sector angle $\alpha = 45°$. Each vector $V_1$ through $V_{10}$ is stored in the image memory 60 in the form of q=12 pixels which correspond to digitized echo signals. The matrix memory of the image memory 60 and of the address memory 71 in the example, consists of 12×12 memory positions (p=q). In the case of the assumed 10 vectors, an active portion of 12×10 memory positions is employed.

In the image memory 60, the 10 image vectors $V_1$ through $V_{10}$ for 12 pixels each are stored parallel adjacent to each other. Additionally, a virtual memory 62 for generating black pixels is employed, whose function will be described in detail below.

In the simplified representation, the columnar and horizontal addresses of both memories 60 and 71 are referenced with S1 through S10. The vertical addresses have the designations M1 through M12 in the address memory 71, R1 through R12 in the image memory 60, and R13 through R17 in the virtual memory 62. A one-dimensional start address memory 72 having q addresses M1 through M12 is shown in FIG. 5 as well as the one-dimensional horizontal memory 61 with P=12 addresses S1 through S12, of which only 10 addresses are active by virtue of the assumed vector number. Only one horizontal memory 61 is employed, however, a second representation of the horizontal memory 61 in dashed lines is shown in FIG. 5 in order to identify the contents thereof during the course of an additional read out operation.

The read out rule for undertaking a read out of the stored information is specific for the particular scan technique utilized and, as stated above, is preselected. Such a read out rule (table, allocation, etc.) is illustrated in the address memory 71 in FIG. 5 as a numerical example. The following steps were individually completed by means of a computer during the generation of the read out rule:

(a) calculation of the start addresses to be deposited in the start address memory 72, as well as the number w of pixels to be read out from the image memory 60;

(b) selection of the pixels to be read out from the image memory 60; and (c) calculation of the respective vertical addresses R1 through R17 of the selected pixels.

The above steps (a) through (c) are specifically carried out for the selected scan type, and need be undertaken only once for the scan type, as soon as the scan type has been called by the selector 100. The actual read out procedure is then executed. This is explained in the numerical example on the basis of the read out of that particular television line corresponding to the horizontal line M5 in the address memory 71 as follows.

From the start address memory 72, the value 3 is read from the memory line M5 as the start address for the horizontal memory 61 (shown in solid lines). This causes the data transmission from image memory 60 to the horizontal memory 61 to be conducted such that the first image information, indicated in the form of an "x", is recorded at the memory position with the address 3 (rather than at the location with the address 1) of the horizontal memory 61. The two first pixels of the horizontal memory 61 are thus set "black", indicated by a blank space in the horizontal memory 61. This corresponds to the left hatched region next to the image region shown in the upper portion D of FIG. 1B.

It is assumed that, on the basis of the calculation according to step (a) it has been ascertained that for the television line corresponding to M5 a total of w=6 pixels are to be read out.

For the duration of the read out of the entire television line in the address memory 71, the units 72 and 73 shown in FIG. 3 address the line M5. The column addresses of the address memory 71 are thus sequentially activated from S1 to S10.

In the line M5 of address memory 71, in the illustrated example, the following information is stored:

7 * 6 * 5 5 * 6 * 7       (1)

The above line (1) signifies that, from the image memory 60, pixels with the addresses S1/7, S3/6, S5/5, S6/5, S8/6 and S10/7 are read out and are continuously (that is, without intermediate spaces) written into the horizontal memory 61. Thus the pixel of the address S1/7 of the image memory 60, which is symbolized by an "x", is transferred to the address S3 in the horizontal memory 61. Correspondingly, the pixel with the address S3/6 of the image memory 60, which is symbolized by a circle is transferred to the address S4 of the horizontal memory 62. The same procedure applies to the following pixels, which are identified in FIG. 5 by a square, a triangle, a dot and an asterisk. These pixels are thus transferred or transmitted to the addresses S5 through S8 of the horizontal memory 61. Pixels in the image memory 60 with which no value is associated (or which are specifically identified as such) in the address memory 71 are not transmitted. These are indicated in the address memory 71 of FIG. 5 by an empty space. The data reduction necessary for the sector scan is thereby effected.

Thus, in the example of line M5, the w=6 information to be represented as a television line is transferred to the horizontal memory 61. It is apparent that the television line has been read out of the image memory 60 along a curved line $Z_j$.

All pixels in the horizontal memory 61 after the last information pixel (symbolized in FIG. 5 by the asertisk) are again set "black" as the initial pixels. These are the pixels with the addresses S9 and S10 of the horizontal memory 61. These black pixels represent the shaded area to the right of the image sector (above the region D2) shown in the upper portion D of FIG. 1B. In the example, in addition, the last two pixels with the addresses S11 and S12 of the horizontal memory 61 are not active. These pixels would only be required if a scan were to be written with a vector number greater than 10.

In the case of the sector scan during read out from the image memory 60, yet additional black pixels are supplied as part of the output. These black pixels correspond to the regions D1 and D2 shown in the upper portion D of FIG. 1B. This is apparent, for example, from the line M10 in FIG. 5. The virtual image memory 62 serves this purpose. The read out operation of the address memory 71 is effected through the units 71 and 72 shown in FIG. 3. With the value 14 from the memory position S1/M10 of the address memory 71, a pixel in the virtual memory 62, that is, a factitious memory position, is addressed. This means that during the read out a black pixel is written into the horizontal memory 61. Only with the next value 12 from the memory position S2/S10 is a brightness value obtained. This value 12 no longer addresses, as do values greater than 12, the virtual memory 62 but rather addresses the real image memory 60. Thus the marginal regions D1 and D2 disposed laterally beneath the sector (shown in the upper portion D of FIG. 1B) are generated. The read out of the line $Z_i$ (see the lower portion C of FIG. 1B) is indicated in FIG. 5 with dashed lines. The various pixels therein are uniformly characterized by circled x's.

Read out of the individual lines M1 through M12 of the address memory 71 proceeds in direction in speed according to the advancing raster scan of the television monitor. The raster scan is thus quasi "imaged" in the read out operation of the address memory 71. Through recording of the read out operation (that is, first addressing of the address memory by the raster control for the television scan followed by addressing of the image memory by the discovered contents of the addressed memory 71) read out of the image memory also takes place onto the horizontal memory 61 and from there onto the monitor 65 with a given scan type with constant frequency.

The sector contents which were intermediately stored in parallel as individual vectors is geometrically correctly represented by the described operation. In the same manner, by specifying a different corresponding read out rule, a different scan type, for example, a trapezoidal scan, may be intermediately stored and geometrically correctly represented as a trapezoid.

For a practical realization in the case of a sector scanner, the image memory 60 may be a matrix of the size $p \times q = 512 \times 512$ with a depth of 8 bits. Thus 512 vectors with 512 scan points or pixels each may be maximally stored, and the amplitude resolution amounts to 8 bits. The address base for the memory 60 (and 62) is dependent upon the half-sector angle $\alpha$ and here amounts to $(512 \times 1/\cos \alpha) \times 512$ bits, whereby the address region above 512 represents the virtual memory 62. The above applies where the angle $\alpha$ is greater than 0 degrees but less than 45 degrees. For half-sector angles $\alpha$ greater than 45 degrees, similar values can be obtained according to a similar rule (utilizing $1/\sin \alpha$) however the calculation method for step (c) becomes more complicated. The read out operation is still undertaken according to the above-described procedure.

The lines of the image memory 60 are thus predominantly addressed with the contents of the address memory 71. The column addresses S1 through S12, in the case of the address memory 71 and in the memories 60 and 62 are identical, and can be linearly counted over. The non-shaded active portion of image memory 60 is thus dependent upon the respective scan type, that is, upon the number of acquired vectors $V_1$ through $V_n$ per scan, as well as upon the number of pixels (scan points) scanned per scan.

In practical realization the address memory 71 also has a matrix of a size $p \times q = 512 \times 512$, however has a depth of 10 bits. Nine bits represent the address for the memories 60 and 62, the tenth bit is a decision bit which determines whether the addressed pixel is represented or displayed. With this structure, given reconstruction of the scan geometry, both pixels outside the sector angle as well as in the virtual memory region can be detected.

Alternatively, the depth of the address memory 71 may be only 9 bits and the decision regarding pixel representation or supression is coded by means of the contents of the address memory 71. For example, a zero written into the address memory 71 may signify data reduction.

The start address memory 72 may in practical realization consist of a $512 \times 1$ matrix with a depth of 8 bits. This memory includes the start addresses for the horizontal memory 61 into which the first pixel of each television line (corresponding to read out of lines $Z_1$ through $Z_k$ of the image memory 60) is written during data transmission (that is, transfer of data from the image memory 60). The address of the horizontal memory 61 is increased after each data transmission from the memories 60 and 62 by one insofar as a pixel is not supressed from image memory 60. With this method the data written into the horizontal memory 61 are densely packed.

The horizontal memory 61 may be practically realized as a matrix of 1×512 with a depth of 8 bits. The active length of the horizontal memory 61 is identical to the active horizontal dimension of the image memory 60, and hence is dependent upon the number of image vectors $V_1 \ldots V_n$. Display of the correct geometric length of the lines stored in the horizontal memory 61 on the monitor 65 is guaranteed through a suitable selection of the read out frequency of the horizontal memory 61 for each scan type. After the read out, the contents of the horizontal memory 61 are cancelled or erased, that is, the horizontal memory 61 is filled with "black" information.

Normally, in the case of representation of an image section from the stored image data, the relative resolution is reduced. If the image memory matrix available for selection is greater than 512×512, the possibility exists of obtaining the same lateral and axial resolution for sectional representation as is available in the normal format.

An advantage of the above-described method is that all vectors $V_1 \ldots V_n$ are stored with the complete original information in the image memory 60. This permits efficient further processing of the image. Another advantage is that changeover to a different scan type requires only the selection of different software for generating the table or allocation.

Much of the above discussion has, as an example, referred to video representation of a sector scan. It will be understood by those skilled in the art, however, that the method and apparatus disclosed and claimed herein are not restricted to the conventional sector format, but may also be utilized for representing any other image geometries.

Although further modifications and changes may be suggested by those skilled in the art, it is the intention of the inventors to embody within the patent warranted hereon all changes and modifications as reasonably and properly come within the scope of their contribution to the art.

We claim as our invention:

1. A method for representing ultrasonic echo signals obtained in succession from an ultrasonic scan having a defined geometric form, said method comprising the steps of:
   forming a plurality of image vectors of equal length, each image vector consisting of vector data and representing a selected plurality of ultrasonic signals received along an ultrasonic scanning line after emission of an ultrasonic pulse;
   entering said image vectors of equal lengths in an image memory having a matrix of memory cells, said image vectors being entered in columnar fashion independently of said geometric form for intermediate storage of said vector data in said image memory;
   reading said vector data from said image memory along curved read-out lines in a format controlled by predetermined representation information stored in an address memory associated with said image memory corresponding to the geometric form of the ultrasonic scan for reconstructing the correct geometric form of said scan, and representing said image vectors at their respective original positions within said scan, thereby using said information stored in said address memory to address said image memory for read-out thereof; and
   displaying the vector data read from said image memory on a display means in a manner conforming to television standards.

2. A method representing ultrasonic echo signals as claimed in claim 1 comprising the additional step of generating a table containing said representation information, said table including information corresponding to the geometric form of said ultrasonic scan.

3. A method for representing ultrasonic echo signals as claimed in claim 2 wherein the step of generating a table is further defined by generating said table only once and storing said table for use with all ultrasonic scans having a geometric form corresponding to the information contained in said table.

4. A method for representing ultrasonic echo signals as claimed in claim 3 wherein the step of generating said table is further defined by calculating the information for entry in said table in an arithmetic unit by address calculation and storing said table in said address memory.

5. A method for representing ultrasonic echo signals as claimed in claim 4 comprising the additional step of selecting the column addresses at which the vector data are stored in said image memory by successively advancing through addresses taken from said table.

6. A method for representing ultrasonic echo signals as claimed in claim 4 comprising the additional step of selecting column and line addresses for the vector data in said image memory from said table.

7. A method for representing ultrasonic echo signals as claimed in claim 4 wherein the addresses of the address memory are selected by at least one incrementing counter.

8. A method for representing ultrasonic echo signals as claimed in claim 1 comprising the additional step of activating a subprogram for enabling an arithmetic unit to generate said representation information, and storing said representation information in an address memory.

9. A method for representing ultrasonic echo signals as claimed in claim 1 comprising the additional step of storing said image vectors in a vector memory before entering said image vectors in said image memory.

10. A method for representing ultrasonic echo signals as claimed in claim 1 for use with an additional image memory, the step of entering said image vectors in said image memory being further defined by the step of alternatingly entering a predetermined plurality of complete image vectors either into said image memory or said additional image memory while simultaneously reading out the other of said image memory or said additional image memory, said image memory and said additional image memory thereby operating in alternating buffer fashion.

11. An apparatus for representing ultrasonic echo signals obtained in succession from an ultrasonic scan having a defined geometric form, said apparatus comprising:
   an ultrasonic transmitting and receiving system for undertaking said ultrasonic scan including means for emitting ultrasonic pulses;
   means for forming a plurality of image vectors of equal length, each image vector consisting of vector data and representing a selected plurality of ultrasonic signals received along an ultrasonic scanning line after emission of an ultrasonic pulse;

an image memory having an orthogonal matrix memory connected to said system for receiving said vector data therefrom and storing said vectors in columnar fashion independently of said geometric form;

an address memory dimensioned the same as said image memory, said address memory containing predetermined representation information corresponding to the geometric form of said scan, and being connected to said image memory for controlling read-out thereof along curved read-out lines for reconstructing the correct geometric form of said scan, and representing said image vectors at their respective original positions within said scan, said address memory being connected to said image memory for using said information in said address memory to address said image memory for read-out thereof; and display means for displaying the data read from said image memory in a manner conforming to television standards.

12. An apparatus for representing ultrasonic echo signals as claimed in claim 11 further comprising an address arithmetic unit connected to said address memory for generating said representation information.

13. An apparatus for representing ultrasonic echo signals as claimed in claim 11 further comprising a processor means connected to said address memory for generating and controlling the addresses of the representation information in said address memory.

14. An apparatus for representing ultrasonic echo signals as claimed in claim 11 further comprising:
a vector memory interconnected between said ultrasonic transmitting and receiving system and said image memory, said vector memory operating in alternating buffer fashion.

15. An apparatus for representing ultrasonic echo signals as claimed in claim 11, further comprising:
a horizontal memory connected to said image memory for functioning as a video line memory, said horizontal memory operating in alternating buffer fashion.

16. An apparatus for representing ultrasonic echo signals as claimed in claim 11, further comprising a selector means connected to said address memory for selecting representaition information corresponding to one of several scanning geometries, said selector means permitting changeover of said apparatus from one type of scan to another.

* * * * *